United States Patent

[11] 3,536,163

| | | |
|---|---|---|
| [72] | Inventor | Demetre Iordanidis<br>Toronto Ontario, Canada |
| [21] | Appl. No. | 663,426 |
| [22] | Filed | Aug. 25, 1967 |
| [45] | Patented | Oct. 27, 1970 |
| [73] | Assignee | By mesne assignments to Dover Corporation,<br>New York, New York<br>a corporation of Delaware |

[54] LOAD WEIGHING MEANS FOR ELEVATOR CARS
1 Claim, 5 Drawing Figs.

[52] U.S. Cl............................................. 187/29
[51] Int. Cl............................................. B66b 1/44
[50] Field of Search......................................... 187/29;
177/210; 317/148.5, 154

[56] References Cited
UNITED STATES PATENTS
2,761,038 8/1956 Bruns et al.................... 187/29X FOREIGN PATENTS
649,978 10/1962 Canada......................... 177/210

Primary Examiner—Oris L. Rader
Assistant Examiner—W. E. Duncanson, Jr.
Attorney—Maybee and Legris ABSTRACT: In an automatic elevator, a load weighing system comprises load weighing means carried by an elevator car for producing an electrical signal which is a function of car load, and signal responsive means forming part of the supervisory equipment of the elevator system and mounted external to the car. The signal responsive means includes an input, circuit, a trigger or switching device, and adjustable circuit means connected in the input circuit for adjusting the level of input signal to which the switching device will respond. The load weighing device comprises an electric oscillator, and transducer means comprising an inductance coil and a mild steel slug which is displaceable relative to the coil in accordance with car load for varying the Q of the coil without substantially varying the inductance of the coil.

Patented Oct. 27, 1970

INVENTOR.
DEMETRE IORDANIDIS

BY *Maybee & Legris*

ATTORNEYS

Patented Oct. 27, 1970

INVENTOR.
DEMETRE IORDANIDIS
BY Maybee & Legris
ATTORNEYS 3,536,163

LOAD WEIGHING MEANS FOR ELEVATOR CARS

BACKGROUND OF THE INVENTION

This invention relates to load weighing means for elevator cars. The running of an automatic elevator is governed by its operating programme, and for safe and efficient operation it is important that the programme should be responsive to load conditions. For example, it is desirable that a fully loaded car should by-pass hall calls; it is also desirable that a car should start immediately from the main floor when it is fully loaded, and that it should not start at all from any floor when overloaded. Hitherto, microswitches situated at different levels beneath the floor of an elevator car have been used for weighing the load. The floor is supported on springs or resilient pads, and variation of the load causes a corresponding displacement of the floor to actuate the microswitches at different levels. This system has the disadvantage of requiring troublesome adjustments and periodical replacement of parts.

Another load weighing system uses an inductor having a core which is displaceable with changes of load to vary the inductance of the inductor and hence modify the alternating current in a tuned circuit of which the inductor forms a part. Such an inductor is expensive and bulky, and adjustments of the inductor to provide suitable characteristics are difficult to make.

It is an object of the present invention to provide a relatively simple load weighing system in which adjustments can be made without difficulty, and from a position external to the elevator car.

SUMMARY OF THE INVENTION

According to the invention, a load weighing system for an elevator car comprises load weighing means carried by the elevator car, the load weighing means comprising signal generating means for generating an electrical output signal and transducer means for varying the level of the output signal in accordance with car load, and signal responsive means external to the car and coupled to the load weighing means for receiving the output signal; the signal responsive means comprises an input circuit, a switching device coupled to the input circuit and operable upon the said output signal attaining a predetermined level, control means operable by the switching device, and adjustable circuit means connected in the input circuit for preselecting the said predetermined level.

In an elevator car comprising a load supporting structure carried by a frame structure, the frame structure being supported on resilient pads located between the load supporting structure and the frame structure, the load weighing means may comprise an electric oscillator and an output circuit therefor, the output circuit comprising a tuned circuit which is inductively coupled to the oscillator, and rectifying means for deriving a direct current signal from the tuned circuit. The tuned circuit may include an inductance coil mounted in fixed relation to one of said structures and having a slug which is mounted in fixed relation to the other structure, the slug cooperating with the coil and being displaceable relative thereto to vary the selectivity of the tuned circuit without substantially varying its resonant frequency.

BRIEF DESCRIPTION OF THE DRAWINGS

One embodiment of the invention, as applied to an automatic elevator, will now be described by way of example with reference to the accompanying drawings, in which.

DESCRIPTION OF THE PREFERRED EMBODIMENT

General

Figure 1:
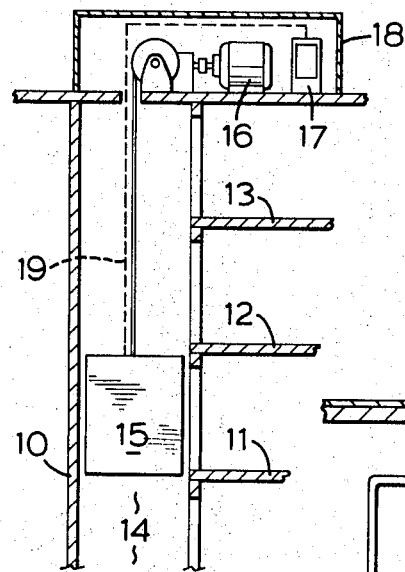
FIG. 1 is a schematic diagram of an elevator system in which load weighing means according to the invention is installed.

Referring to FIG. 1, a structure 10 such as a building having a number of floors 11, 12, 13 etc. is provided with an elevator shaft 14 in which an elevator car 15 operates between the different floors. The car 15 is driven by an electric motor 16 which is controlled in accordance with an operating programme. The motor 16 and supervisory equipment 17 therefor are located in a penthouse 18. Load weighing means carried by the car 15 provide a load-dependent output signal which is transmitted to the supervisory equipment 17 via a cable 19.

Load Weighing Means

Figure 2:
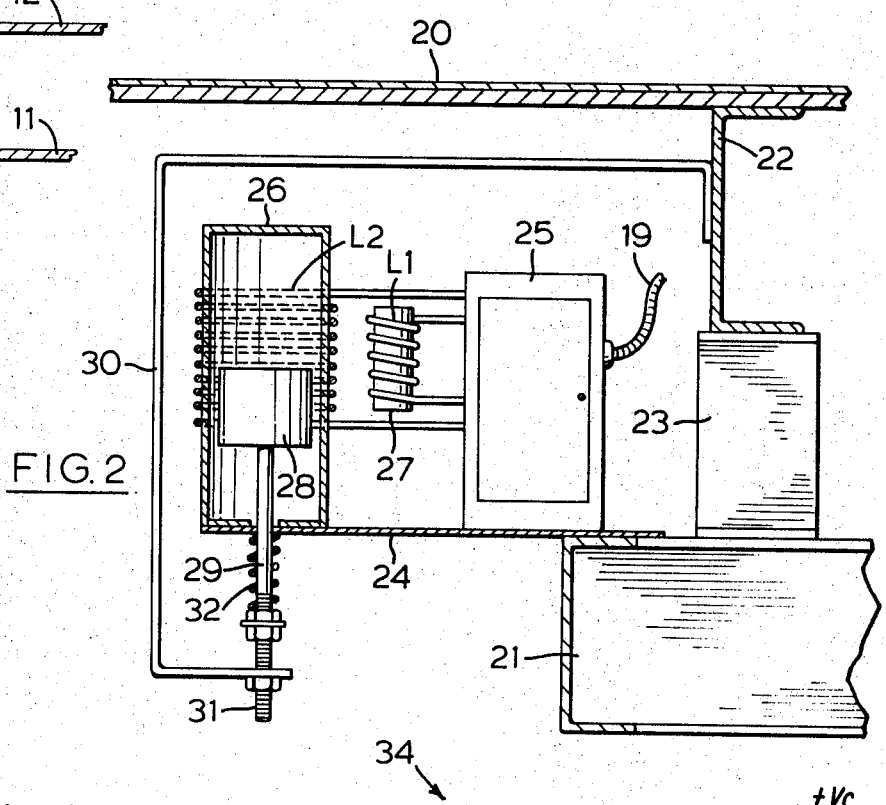
FIG. 2 is a fragmentary sectional view of an elevator car, the FIG. showing the physical disposition of the load weighing means.

Referring to FIG. 2, the elevator car comprises a load-supporting structure, represented in the drawing by the car floor 20, and a frame structure, represented in the drawing by a bottom beam 21. The car floor 20 is mounted on joists 22 which are supported on resilient pads 23 located between the joists and the bottom beam. A shelf table 24 is carried by the bottom beam 21, and this shelf or table provides a fixed mounting for a housing 25, which contains most of the electrical equipment of the load weighing means to be described below, and a former 26 on which an inductance coil L2 is wound. A second inductance coil L1 wound on a former 27 is loosely air coupled to the coil L2. The coil L1 forms part of an oscillator circuit as described below with reference to FIG. 3, and the coil L2 forms part of a tuned secondary circuit.

A slug 28 which extends into the coil L2 is mounted at the top of a vertical support shaft 29 carried by an arm 30 extending from the floor joist 22.

The shaft 29 extends through a hole in the shelf 24. Initial setting of the slug with respect to the coil L2 during installation is effected by an adjusting screw 31, and the slug is biased towards its set position by a hold-down spring 32. It will be seen that the coil L2, being mounted on the shelf 24, maintains a fixed relation to the frame structure of the elevator car, represented by the bottom beam 21, and the slug 28, being supported from the floor joist 22, maintains a fixed relation to the car floor 20. The slug is of a material such as mild steel which is effective to influence the Q of the coil L2 without substantially influencing its inductance; therefore, when the car floor is moved relative to the frame structure by changes of load, thereby displacing the slug relative to the coil L2, the effective reactance of the coil is not substantially changed, but its effective resistance changes thus modifying the secondary current induced in it.

The secondary current is converted, in the manner described below with reference to FIG. 3, into a direct current signal which is a continuous function of floor displacement, and hence of car load. The relationship between the magnitude of the signal and the floor displacement is illustrated by the curve shown in FIG. 5, and the "no-load" and "full-load" positions are preferably selected to utilize that portion of the curve which is approximately linear.

Circuit of Load Weighing Means

Figure 3:
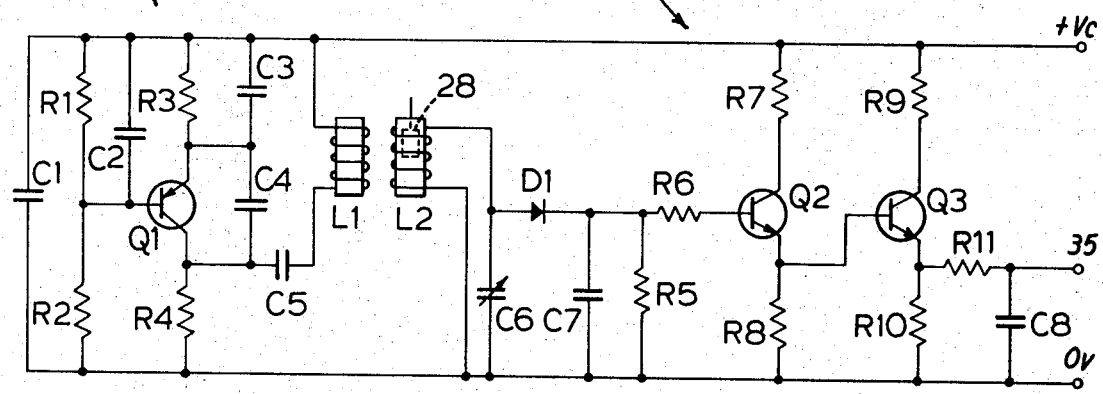
FIG. 3 is a circuit diagram of the load weighing means of FIG. 1.

As illustrated in FIG. 3, the load weighing means comprises a signal generating means consisting of an electric oscillator 33 and an output circuit 34 therefor, and transducer means formed by the coil L2 and slug 28. The signal generating means employs solid state devices energized from a DC voltage supply $+V_c$.

The oscillator 33 includes a transistor Q1 connected in a stable radio frequency, Colpitts oscillator circuit having a low impedance tank circuit formed by capacitors C3 and C4 and the inductance coil L1. A coupling capacitor C5 and radio frequency by-pass capacitors C1, C2 are connected in the circuit in the conventional manner. A temperature-compensated biassing network is provided by resistors R1, R2, R3 and R4, resistor R4 also acting as a blocking resistor to the oscillator tank circuit.

The inductance coil L2 forms with an adjustable capacitor C6 a secondary resonant circuit, which is tuned to the frequency of the oscillator. The radio frequency output voltage of the tuned circuit is rectified by a diode D1 and smoothing capacitor C7, and the rectified signal is applied to the base of a second transistor Q2 through a base resistor R6. The transistor Q2 has a collector current-limiting resistor R7, a base biassing resistor R5, and an emitter load impedance provided by resistor R8 which forms the base biassing resistor of a third transistor Q3. The transistor Q2 operates as an emitter follower and drives transistor Q3, which also operates as an emitter follower. The transistor Q3 has a collector current-limiting resistor R9 and an emitter output resistor R10. The output signal from transistor Q3 is fed to an output terminal 35, and a transient voltage suppressing network for protecting the transistor Q3 from voltage spikes appearing at the output terminal is formed by a resistor R11 and capacitor C8. By operating transistors Q2 and Q3 as emitter followers, the rectified radio frequency voltage applied to the high input impedance of transistor Q2 now appears in the low output impedance of transistor Q3, with negligible loading of the tuned circuit.

Circuit of Signal Responsive Means

The signal responsive means essentially comprises an input circuit which is coupled to the output circuit of the load weighing means for receiving the DC output signal therefrom, a switching device which operates when the DC signal attains a predetermined level, a control circuit operated by the switching device, and adjustable circuit means connected in the input circuit for adjusting the signal level to which the switching device is responsive.

Figure 4:
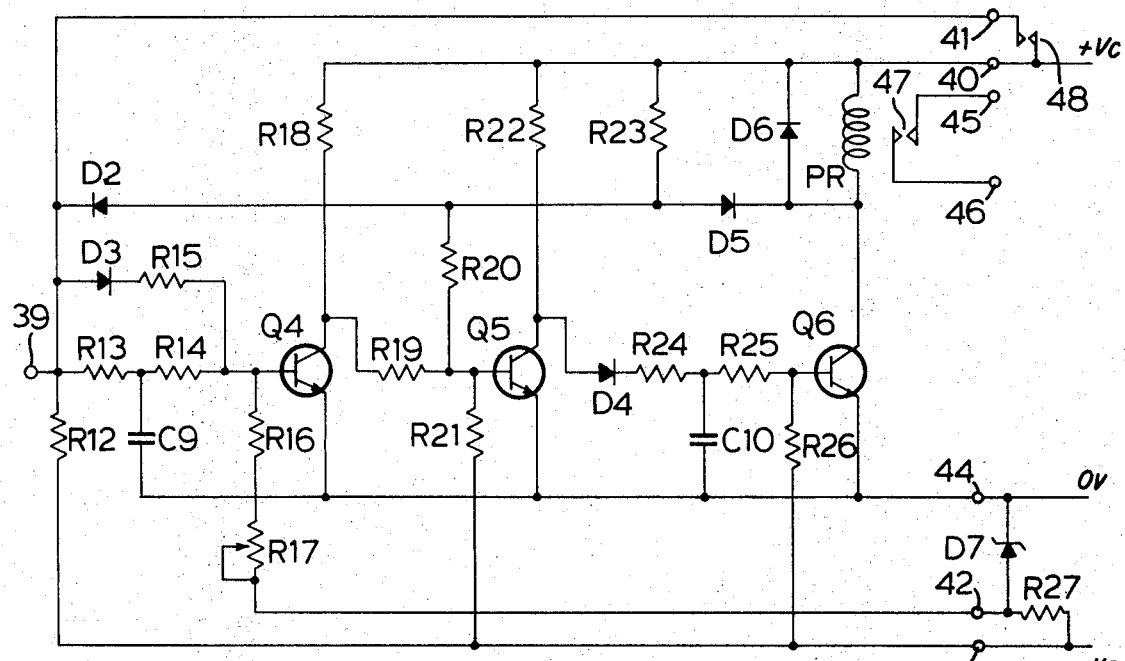
FIG. 4 is a circuit diagram of signal responsive means forming part of the supervisory equipment of the elevator and responding to the output of the circuit of FIG. 3.

Referring to FIG. 4, the signal responsive means utilizes solid state devices energized from a power supply providing a positive voltage $+V_c$ for collector requirements and a negative voltage $-V_B$ for base biassing requirements. It is assumed that the voltages $+V_c$ and $-V_B$ are to equal magnitude and opposite polarity. The circuit includes transistors Q4, Q5 and Q6 which are of the NPN type operating as switches. The circuit of the signal responsive means has an input terminal 39, which is connected to the output terminal 35 of the load weighing circuit, positive supply terminals 40, 41, negative supply terminals 42, 43, an earthed terminal 44 and output terminals 45, 46 of the control circuit.

The signal from the input terminal 39 is applied to the base of transistor Q4 via a current-limiting input resistor R14, the transistor being protected against voltage spikes that may appear at the input terminal by a transient voltage suppressing network comprising resistor R13 and capacitor C9. The collector of transistor Q4 is connected to terminal 40 via a collector resistor R18, and the base is connected to terminal 42 via resistors R16 and R17, which determine the base bias of the transistor. The resistor R17 is a variable resistor which can be adjusted to control the base bias of transistor Q4 and so control the input voltage level at which the transistor will switch ON. Transistor Q4 drives the second switching transistor Q5 through a driving resistor R19, which together with resistor R21 forms the base biassing network of transistor Q5. R22 is the collector resistor of transistor Q5. A diode D4 connected to the collector of transistor Q5 forms with resistors R24, R25 and capacitor C10 a time delay network in the input circuit to the third switching transistor Q6, so that switching of the latter will follow the switching of transistor Q5 only after a certain delay. This provision enables the switching device to ignore sudden temporary variations of car load, which may be caused by jumping, for example. The resistors 24 and 25 form with a resistor R26 the base biassing network of transistor Q6. In the collector circuit of transistor Q6 is a relay coil PR which operates relay contacts 47, the latter being connected in the control circuit across terminals 45, 46. A quench diode D6 prevents the voltage across transistor Q6, during switching OFF, from exceeding the supply voltage $+V_c$. When a positive signal voltage of a predetermined magnitude, or higher, appears at input terminal 39, transistor Q4 switches ON, thereby removing the positive voltage from the base of transistor Q5, which switches OFF. With transistor Q5 OFF, positive voltage applied through resistors R22, R24, R25 and diode D4 drives transistor Q6 ON, and the relay coil PR is energized, thus closing contacts 47. When the positive voltage at terminal 39 decreases to below the predetermined level, then transistor Q4 switches OFF, driving transistor Q5 ON; transistor Q6 is thus switched OFF and the relay is deenergized. The predetermined level of input signal at which the transistor Q4 will switch ON is selected by appropriate adjustment of the variable resistor R17.

A resistor R27 and a zener diode D7 are connected in series between the terminals 43 and 44, the midpoint being connected to terminal 42, which is connected to the base of transistor Q4 via resistors R16 and R17. The negative base bias so provided determines the triggering voltage level.

Memory Circuit

The contacts 48 of a programme relay are connected between terminals 40 and 41, and these contacts form with resistors R23, R20, R15, R12, and diodes D2, D3, and D5, a HOLD or MEMORY circuit for the signal responsive means. The HOLD or MEMORY circuit enables the signal responsive means to remember and maintain the state that it had immediately prior to closing of contacts 48. With contacts 48 open, the resistors R12 and R23 form a divider network between the terminals 40 and 43. When transistor Q6 is OFF, the diode D5 is reverse biased, and because the resistance of resistor R23 is greater than that of resistor R12, a small negative voltage appears through resistor R20 in the base of transistor Q5. The voltage is of such a magnitude that transistor Q5 can still be driven by transistor Q4. When transistor Q6 is ON, then diode D5 is forward biased, and again a small negative voltage appears at the common point of resistors R23 and R20.

Let it be assumed that an input signal exceeding the triggering level appears at input terminal 39; then transistor Q4 switches ON, transitor Q5 switches OFF, and Q6 switches ON after a certain delay. Let it now be assumed that contacts 48 close. Positive voltage is applied through diode D3 and resistor R15 to the base of transitor Q4, which is held ON. Now transistor Q4 will remain ON whatever the conditions at input terminal 39. With contacts 48 closed resistor R12 is connected direct to the positive voltage supply and diode D2 becomes reverse biased. Transistor Q6 being ON keeps the diode D5 forward biased and the voltage at the common point of resistors R23 and R20 is near zero. The consequence is that transistor Q5 can be driven only by transistor Q4, and since the latter is ON, transistor Q5 remains OFF and transistor Q6 remains ON.

Let it now be assumed that while contacts 48 are open, the input voltage at terminal 39 decreases to below the triggering level. Transistors Q4, Q5 and Q6 consequently switch OFF, ON and OFF, respectively. Now let contacts 48 close, diode D2 again becoming reverse biased. Transistor Q6, which is OFF, holds the diode D5 reverse biased, and positive voltage through resistors R23 and R20 holds transistor Q5 ON as long as contacts 48 remain closed. With transistor Q5 switched ON, transistor Q6 remains OFF, holding the same state as before.

The above description shows that transistor Q6 will maintain the state that it had immediately before closing of contacts 48, for as long as the contacts remain closed, whatever the voltage conditions at the input terminal.

Operation of System

Figure 5:
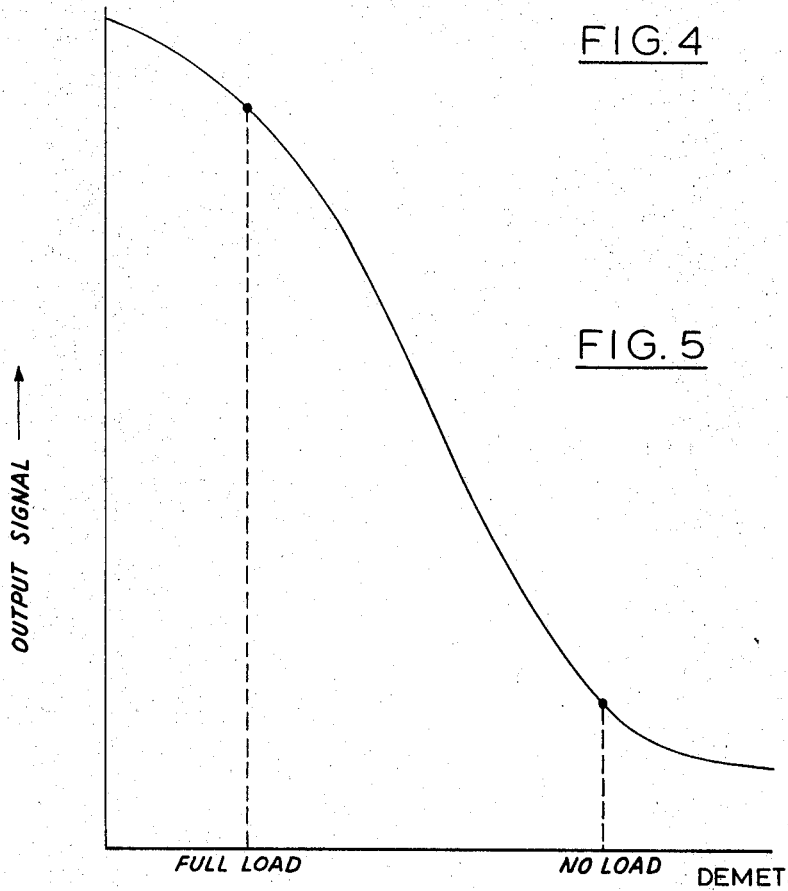
FIG. 5 is a graph showing the relationship between car load and the output signal from the load weighing means.

Referring again to FIG. 2, when the load weighing device is installed the adjusting screw 31 is set so that the mild steel slug is wholly inside the coil L2 when the car is unloaded. In operation, when the load increases the car floor is depressed and so displaces the slug from the coil by an amount proportional to the load; the voltage induced in the secondary circuit increases, primarily because of the increasing Q factor of the coil L2. The result is that the DC output signal increases with floor displacement in an almost linear manner as illustrated by FIG. 5. This signal is applied to the input of the signal responsive means described with reference to FIG. 4, and the control circuit thereof is operated when the said output signal attains a predetermined level corresponding to a certain load. The control circuit can be made to operate at any particular signal, and hence any selected load, by adjusting the resistor R17 of FIG. 4. Thus, if it is necessary to change the characteristics of the load weighing system, or to make subsequent adjustments to compensate for changes in the mechanical characteristics of the car structure, this can be done very simply from the penthouse in which the signal responsive means is housed.

By using a single load weighing circuit of the kind illustrated in FIGS. 2 and 3, and a plurality of signal responsive means of the kind illustrated in FIG. 4 connected in parallel, a very versatile control system is obtained.

Electrical Components

The particular system described herein is designed for a maximum floor displacement of 0.25 inches from zero load to full load. The oscillator operates at a frequency of 13 Mc/s and the circuits are energized from a voltage supply of +18 volts and −18 volts. The approximate values of the individual electrical components are listed below:

Q1—Transistor 2N2090 or similar.
Q2 to Q6—Transistor BC107 or similar.
D1—Diode IN541 or similar.
D2 to D6—Diode IN457 or similar.
D7—Zener diode with 5 v. zener voltage at 30 ma.
R1—Resistor 15k ohm, ½ watt, 5%.
R2—Resistor 100k ohm, ½ watt, 5%.
R3—Resistor 1.2k ohm, ½ watt, 5%.
R4—Resistor 5.6k ohm, ½ watt, 5%.
R5—Resistor 1m ohm, ½ watt, 5%.
R6—Resistor 100 ohm, ½ watt, 5%.
R7—Resistor 1k ohm, ½ watt, 5%.
R8—Resistor 100k ohm, ½ watt, 5%.
R9—Resistor 220 ohm, ½ watt, 5%.
R10—Resistor 22k ohm, ½ watt, 5%.
R11—Resistor 100 ohm, ½ watt, 5%.
R12—Resistor 56k ohm, ½ watt, 5%.
R13—Resistor 220 ohm, ½ watt, 5%.
R14—Resistor 8.2k ohm, ½ watt, 5%.
R15—Resistor 8.2k ohm, ½ watt, 5%.
R16—Resistor 4.7k ohm, ½ watt, 5%.
R17—Carbon potentiometer 100k ohm, ½ watt.
R18—Resistor 62k ohm, ½ watt, 5%.
R19—Resistor 62k ohm, ½ watt, 5%.
R20—Resistor 62k ohm, ½ watt, 5%.
R21—Resistor 220k ohm, ½ watt, 5%.
R22—Resistor 15k ohm, ½ watt, 5%.
R23—Resistor 62k ohm, ½ watt, 5%.
R24—Resistor 820 ohm, ½ watt, 5%.
R25—Resistor 3.3k ohm, ½ watt, 5%.
R26—Resistor 62k ohm, ½ watt, 5%.
R27—Resistor 390 ohm, 1 watt, 5%.
C1—Capacitor 0.002 mf., 50 v.
C2—Capacitor 0.002 mf., 50 v.
C3—Capacitor 1000 pf., 50 v.
C4—Capacitor 200 pf., 50 v.
C5—Capacitor 0.002 mf., 50 v.
C6—3–30 pf. variable capacitor.
C7—Capacitor 0.002 mf., 50 v.
C8—Capacitor 0.1 mf., 200 v.
C9—Capacitor 0.1 mf., 200 v.
C10—Capacitor 250 mf., 30 v., electrolytic.
L1—11 Turns #22 Wire, d.=⅜".
L2—23 Turns #32 Wire, d.=11/16".
Core used for L2 is mild steel with a diameter of 0.530" and a height of ½".
PR—Relay with coil resistance of 1,500 ohms designed to pick up with 12 volts.

I claim:

1. A load weighing system for an elevator car, comprising load weighing means carried by the elevator car, the load weighing means comprising signal generating means for generating an electrical output signal and transducer means for varying the level of the output signal in accordance with car load, and signal responsive means external to the car and coupled to the load weighing means for receiving the output signal, the signal responsive means comprising an input circuit, a switching device coupled to the input circuit and operable upon the said output signal attaining a predetermined level, control means operable by the switching device, and adjustable circuit means connected in the said input circuit for preselecting said predetermined level, wherein the signal responsive means further includes a memory circuit coupled to the switching device, and the switching device includes a switching transistor having a base, a collector, and an anode, operation of the switching device being depended upon operation of the transistor, the memory circuit comprising a voltage dividing network, means for deriving a control voltage from the network, means for applying the control voltage to the base of the transistor, and switching means for bypassing a section of the voltage dividing network whereby to change said control voltage so that the transistor maintains a given state irrespective of any signal appearing in the input circuit.